(No Model.)

E. M. THOMPSON.
SHIPPING CASE.

No. 407,137. Patented July 16, 1889.

WITNESSES.
Gustav Bohn
E. B. Griffith

INVENTOR.
Evert M. Thompson
By C. F. Jacobs
atty.

UNITED STATES PATENT OFFICE.

EVERT M. THOMPSON, OF EVANSVILLE, INDIANA.

SHIPPING-CASE.

SPECIFICATION forming part of Letters Patent No. 407,137, dated July 16, 1889.

Application filed April 20, 1888. Serial No. 271,355. (No model.)

*To all whom it may concern:*

Be it known that I, EVERT M. THOMPSON, of Evansville, county of Vanderburg, and State of Indiana, have invented certain new and useful Improvements in Shipping-Cases; and I do hereby declare that the following is a full, clear, and exact description thereof, reference being had to the accompanying drawings, in which like letters refer to like parts.

My invention relates to the construction of cases for shipping eggs, and will be understood from the following description.

Figure 1:
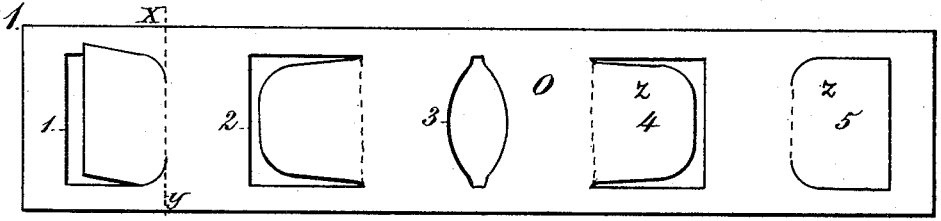
Figure 2:
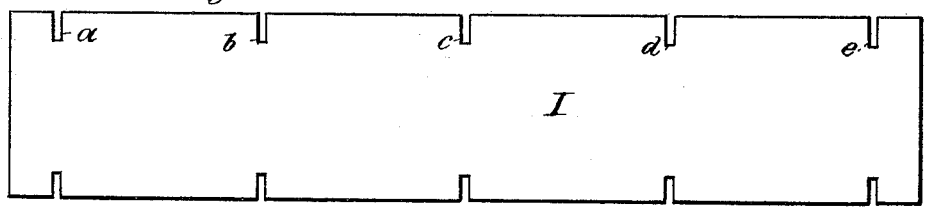
Figure 3:
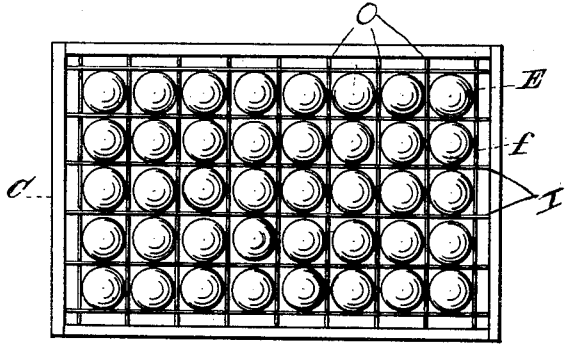

In the drawings, Figure 1 represents a side view of a splint of thin wood O, by me called an "outer splint," having its area partially cut out, as indicated at 1, 2, 3, 4, and 5. Fig. 2 represents the other splint I, of substantially the same width, by me called the "inter splint," having parts of its area cut away at the edges in the shape of notches, as shown at $a$, $b$, $c$, $d$, and $e$. Fig. 3, which is drawn on a reduced scale, shows a completed case composed of a number of these outer splints, with inter splints passed through their gated apertures 1, 2, 3, 4, and 5 far enough to allow the notches of the inter splints to catch or lock with the outer splints in the manner shown in Fig. 4, which is a perspective view, on an enlarged scale, of a single cell E, representing the egg in place. The projecting ends of the splints, as shown in Fig. 3, serve as points of resistance to protect the outer row of cells from violent contact with the inside of the case.

In Fig. 1 the central opening 3 is only used, if at all, at the center line of the completed case, all the other openings being of the form shown in 1 2 4 5, in which all or nearly all of the openings are closed by a gate $z$, whose rear part is connected to the body of the strip, a score being made across at the back of the gate, as indicated by the dotted line $x\ y$, this score being a line cut partly through across the strip or perforations made at intervals, so as not to entirely sever the strip, thus forming a hinge for the gate $z$, and such scoring and cutting are necessary, or the gate cannot be swung over, so as to open far enough to admit the inter splints without breaking the gate off. If the outer and inter splints are not substantially of the same width—that is, if one is left much wider than the other—the pressure upon the top of the filler or case will crush the edges of the wider splints and crack or break the shells of the eggs, thus making the filler valueless. The outer splint, therefore, is made in the shape shown, with gated apertures formed in the body portion, and in no case extending to the edge of the splint, while the reverse is true of the inter splints, which have no openings in the body, but only notches cut in their edges. This construction permits the application of a simple mechanism, wherein the outer splints are placed in parallel slots in a former and the inter splints are readily shoved into position, and the whole being removed from the former is found to be interlocked at every joint in the manner described.

Figure 4:
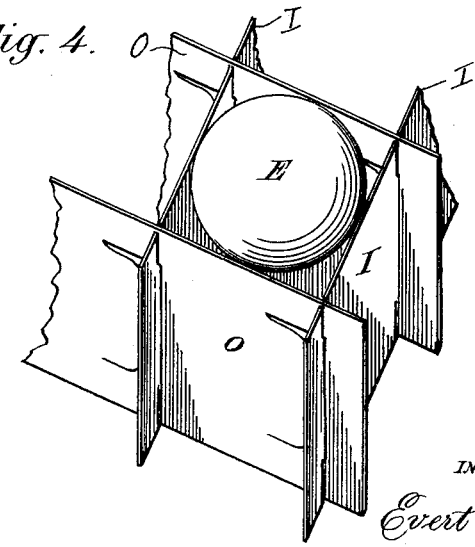

It is evident that to pass one splint of thin wood through another, the two being substantially of equal width, so that when the inter splint is flattened it shall stand at right angles to the outer splint, as shown in Fig. 4, it becomes necessary to bend the inter splint somewhat in the line of its grain, so that the distance from one of its edges to the other shall be less than the width of the gated opening in the outer splints. This can be accomplished by using splints of thin material having a grain—such as wood—as the splints will recover from this bending after passing through the opening, the elasticity of the wood serving to straighten it out in proper position; but this is not completely effected where the splints are made of straw-board or other material having no grain. After the inter splint has been passed through the opening in the outer splint, the little gate $z$ being thrown back to admit it, the latter will close automatically, owing to the elasticity of the fiber of the hinge, and the front edge of the gate will wedge against the face of the outer splint, thereby forming a substantial lock.

As will be seen by reference to Fig. 1, the gated aperture at the ends of the splint are hinged in opposite directions—that is, the hinge part is formed opposite the narrow part of the strip near the end, and this is essential where wood is used, otherwise the fibers near the end would break off when they are twisted by the strain of the hinge, and the structure would be destroyed. Thus, in my mode of interlocking the joints the grain of the wood and the elasticity of its fibers are utilized, and the splints are not weakened with reference to the service to be done. It is further evident that when the strips forming the filler are united in this way the completed structure is collapsible, so as to occupy little space in packing for shipment, the design being to supply the cheapest possible filler that will serve for shipping-cases for eggs, and at the same time to furnish one that can be readily compressed into bundles for shipment in large lots.

I do not broadly claim the use of thin strips of wood for making cases for shipping eggs, for I am aware that such have been previously known and used; but What I do claim as my invention, and desire to secure by Letters Patent, is the following, viz:

A collapsible filler formed of outer splints having openings formed in the body thereof for admitting inter splints, such openings closed by gates moving upon scored or perforated hinges at the rear of such gate, the gated openings at the ends of such splints formed in a reverse position with reference to each other, in combination with inter splints I, having notches cut in their edges and interlocking with the outer splints at each joint, substantially as shown and described.

In witness whereof I have hereunto set my hand this 12th day of April, 1888.

EVERT M. THOMPSON.

Witnesses:
C. W. JARVIS,
S. W. COOK.